United States Patent
Heuken et al.

(10) Patent No.: US 9,124,189 B2
(45) Date of Patent: Sep. 1, 2015

(54) CONVERTER WITH GALVANIC ISOLATION

(71) Applicant: Infineon Technologies Austria AG, Villach (AT)

(72) Inventors: Tobias Heuken, Munich (DE); Marc Fahlenkamp, Munich (DE)

(73) Assignee: INFINEON TECHNOLOGIES AUSTRIA AG, Villach (AT)

(*) Notice: Subject to any disclaimer, the term of this patent is extended or adjusted under 35 U.S.C. 154(b) by 122 days.

(21) Appl. No.: 13/757,725

(22) Filed: Feb. 1, 2013

(65) Prior Publication Data
US 2014/0218978 A1    Aug. 7, 2014

(51) Int. Cl.
*H02M 3/335* (2006.01)
*H05B 33/08* (2006.01)

(52) U.S. Cl.
CPC ....... *H02M 3/33523* (2013.01); *H05B 33/0818* (2013.01)

(58) Field of Classification Search
CPC .......... H02M 3/33523; H02M 1/4258; H02M 3/33576; Y02B 70/126
USPC ......... 363/16–20, 21.01, 21.02, 21.06, 21.08, 363/21.12, 21.16, 21.18, 41, 49, 899, 7, 98, 363/95, 56.11; 323/207, 222, 271–274, 323/282–285
See application file for complete search history.

(56) References Cited

U.S. PATENT DOCUMENTS

| | | | | |
|---|---|---|---|---|
| 4,623,960 A * | 11/1986 | Eng | ............................. | 363/21.08 |
| 7,259,948 B2 * | 8/2007 | Minatani | ...................... | 361/91.1 |
| 7,362,593 B2 * | 4/2008 | Yang et al. | ................. | 363/21.16 |
| 7,545,654 B2 | 6/2009 | Berghegger | | |
| 8,045,344 B2 * | 10/2011 | Grant | ............................. | 363/28 |
| 8,199,532 B2 * | 6/2012 | Grande et al. | ............. | 363/21.01 |
| 8,213,192 B2 * | 7/2012 | Konecny et al. | ........... | 363/21.13 |
| 2012/0287682 A1 | 11/2012 | Zhang et al. | | |

FOREIGN PATENT DOCUMENTS

WO    WO 2007/121945 A2    11/2007

OTHER PUBLICATIONS

ICs for Consumer Electronics, Controller for Switch Mode Power Supplies Supporting Low Power Standby and Power Standby and Power Factor Correction, TDA 16846/TDA 16847, Data Sheet, Jan. 14, 2000.

* cited by examiner

*Primary Examiner* — Rajnikant Patel
(74) *Attorney, Agent, or Firm* — SpryIP, LLC

(57) ABSTRACT

A converter is suggested comprising a transformer providing a galvanic isolation between a primary side and a secondary side of the converter; at least one switching element; a converter control unit comprising a first pin for controlling the at least one switching element and a second pin for detecting a current signal in the at least one switching element during a first phase; and for detecting an output voltage signal of the secondary side of the converter and an information regarding a current in a secondary winding of the transformer during a second phase.

42 Claims, 7 Drawing Sheets

CONVERTER WITH GALVANIC ISOLATION

BACKGROUND OF THE INVENTION

Embodiments of the present invention relate to converters comprising a galvanic isolation between the input and any outputs.

A flyback converter is used in AC/DC as well as DC/DC conversion with galvanic isolation between the input and outputs. The flyback converter can be realized as a buck-boost converter with an inductor split to form a transformer so that the voltage ratios are multiplied with an additional advantage of isolation.

SUMMARY

A first embodiment relates to a converter comprising a transformer providing a galvanic isolation between a primary side and a secondary side of the converter; at least one switching element and a converter control unit. The converter control unit comprises a first and a second pin, wherein the first pin is used for controlling the at least one switching element. The second pin is used for detecting a current signal in the at least one switching element during a first phase; and for detecting an output voltage signal of the secondary side of the converter and an information regarding a current in a secondary winding of the transformer during a second phase.

A second embodiment relates to a converter control unit for driving a converter comprising a first pin for controlling at least one switching element of the converter, wherein the converter comprises a transformer providing a galvanic isolation between a primary side and a secondary side of the converter. The converter unit also comprises a second pin for detecting a current signal in the at least one switching element during a first phase; and for detecting an output voltage signal of the secondary side of the converter and an information regarding a current in a secondary winding of the transformer during a second phase.

A third embodiment relates to a flyback converter system comprising a transformer providing a galvanic isolation between a primary side and a secondary side of the converter; at least one switching element; and a converter control unit. The converter control unit comprises a first pin for controlling the at least one switching element; and a second pin for detecting a current signal in the at least one switching element during an on-phase of the at least one switching element; and for detecting via an additional winding of the transformer an output voltage signal of the secondary side of the converter and an information regarding a current in a secondary winding of the transformer during an off-phase of the at least one switching element.

A forth embodiment is directed to method for operating a converter, wherein the converter comprises a transformer providing a galvanic isolation between a primary side and a secondary side of the converter. The method comprises the following steps:
  detecting via a second pin of a converter control unit a current signal in at least one switching element during a first phase; and
  detecting via the second pin of the converter control unit an output voltage signal of the secondary side of the transformer and an information regarding a current in a secondary winding of the transformer during a second phase,
  controlling the at least one switching element via a first pin of the converter control unit.

A fifth embodiment relates to flyback converter comprising means for providing a galvanic isolation between a primary side and a secondary side of the converter; switching means; first detecting means for detecting a current signal in the switching means during an on-phase of the switching means; second detecting means for detecting an output voltage signal of the secondary side of the converter and an information regarding a current in the secondary side of the converter during an off-phase of the switching means; and control means comprising a first pin for controlling the switching means; and a second pin for detecting the signals and the information of the first detecting means and the second detecting means.

BRIEF DESCRIPTION OF THE DRAWINGS

Embodiments are shown and illustrated with reference to the drawings. The drawings serve to illustrate the basic principle, so that only aspects necessary for understanding the basic principle are illustrated. The drawings are not to scale. In the drawings the same reference characters denote like features.

DETAILED DESCRIPTION OF THE PREFERRED EMBODIMENTS

Figure 1:
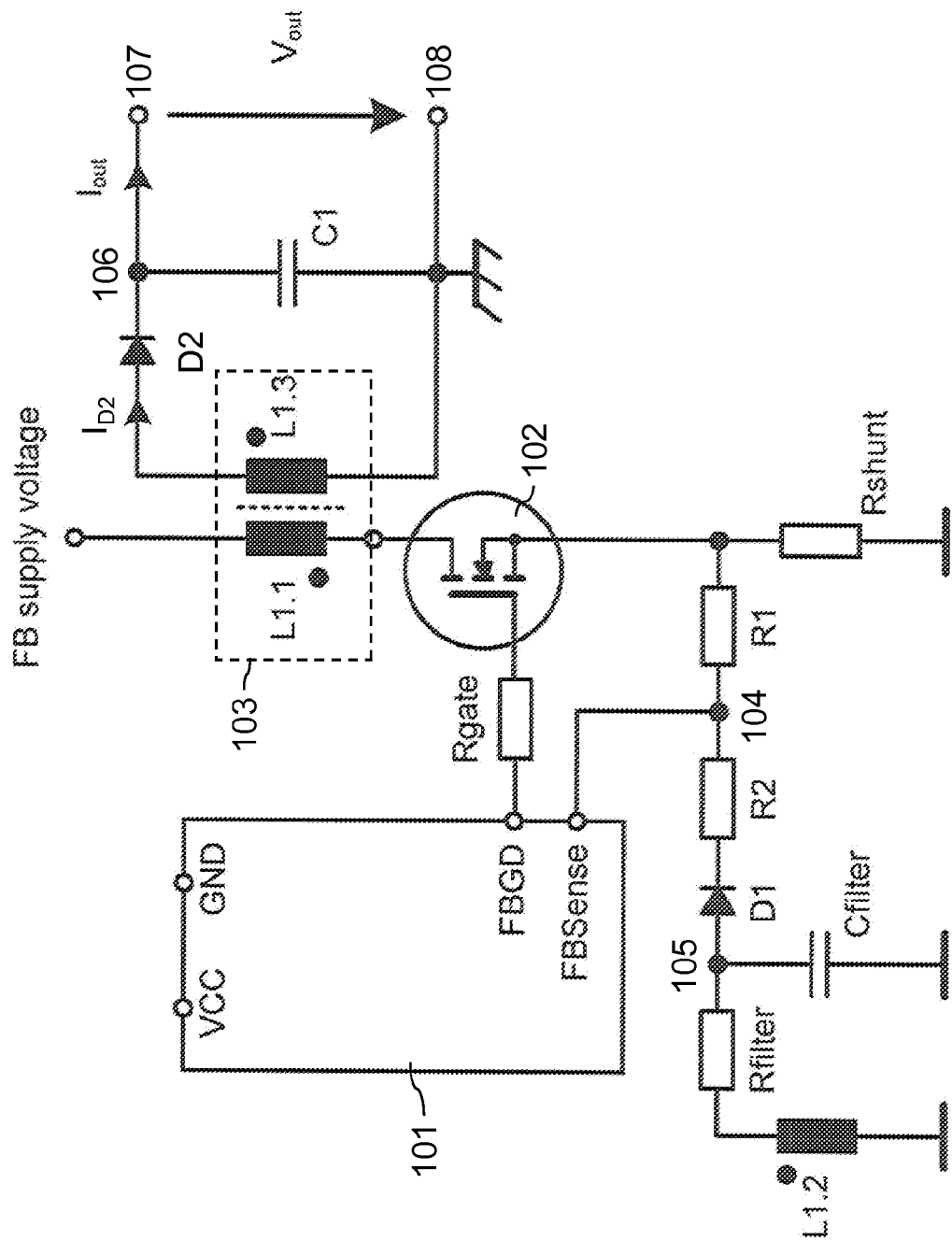
FIG. 1 shows an exemplary and schematic circuit diagram comprising a flyback (FB) control integrated circuit (IC) with a multi-purpose pin FBSEnse that is used for two different modes of operation.

The converter described herein can be realized as flyback (FB) converter. The FB converter comprises a converter control unit, e.g., a flyback control integrated circuit for driving at least one switching element of the FB converter in a suitable manner. The converter control unit can be realized as a microcontroller or any kind of controlling device. Such controlling device may drive at least one converter control unit.

For efficiently operating a flyback converter, several parameters or signals, e.g., measurement values, are beneficially considered. With a demand for higher integration into existing or even a smaller housing comes a motivation to use fewer parts as well as to use less pins of an integrated circuit (IC).

A flyback converter comprises a primary and a secondary side. The primary side refers to the part of the circuitry which is fed by a power voltage providing a FB supply voltage. The secondary side provides an output of the flyback converter.

The flyback converter comprises at least one switching element on the primary side, which can be realized as a transistor, in particular a Mosfet. It is noted that several switching elements can be utilized according to the solution presented herein. With regard to the flyback converter, the at least one switching element is referred to herein as "FB switching element". Each FB switching element can have an on-phase $t_{On}$ and an off-phase $t_{Off}$, during which it is switched on or off.

Advantageously, the following signals, e.g., measurement values, are utilized during operation of a flyback converter:

$I_{Lpeak}$: a current in the transformer of the flyback converter during an on-phase of the FB switching element. This allows detecting a current in the transformer, which is deemed too high.

$V_{out}$: a voltage of the secondary side of the flyback converter. This parameter allows avoiding that components are damaged during idle state and it allows switching off at a predefined maximum output voltage.

$t_{ZCD}$: a time at which the current in the secondary winding of the transformer reaches zero (the FB switching element being off).

Additional signals can be utilized on the primary side for controlling purposes, e.g., via the converter control unit:

The signal $I_{Lpeak}$ and the duty cycle of the FB switching element allows controlling the output current.

The signal $V_{out}$ may be determined via an auxiliary winding of the (primary side of the) transformer in order to control the output voltage.

The solution presented allows reducing the number of pins required for the converter control unit thereby maintaining the functionality and/or providing additional functionalities.

Advantageously, the solution described herein allows determining parameters or signals to operate a flyback converter in an efficient manner using a reduced number of pins, e.g., only two IC pins.

A first pin FBGD ("flyback gate driver") is the driver output for the FB switching element. A second pin is referred to as FBSense, which is used for determining the required signals of the flyback converter. As not all signals need to be available at all times, it is possible to detect different signals at different instants of time via a single pin (here: the FBSense pin).

Another advantage of the solution presented herein is the possibility to precisely control the output parameters, e.g., output voltage and output current, of the flyback converter.

FIG. 1 shows an exemplary and schematic circuit diagram comprising a FB control integrated circuit (IC) 101, to which a supply voltage VCC and a ground GND are connected (not shown). The FB control IC 101 comprises an output FBGD, which is a flyback gate driver, connected via a resistor Rgate to the gate of a Mosfet 102, which in this example serves as the FB switching element. The drain of the Mosfet 102 is connected to one pin of the primary side L1.1 of a transformer 103. The other pin of the primary side L1.1 of the transformer 103 is connected to a FB supply voltage, e.g., the output voltage of a power factor correction stage.

The FB control IC 101 further comprises an FBSense pin, which is connected to a node 104. This node 104 is connected via a resistor R1 to the source of the Mosfet 102 and the source of the Mosfet 102 is further connected via a resistor Rshunt to ground. The node 104 is also connected via a series connection comprising a resistor R2 and a diode D1 to a node 105, wherein the cathode of the diode D1 points towards the node 104. The node 105 is connected via a series connection comprising a resistor Rfilter and an inductor L1.2 to ground. The inductor L1.2 can be realized as an auxiliary winding to the primary winding L1.1 of the transformer 103. In addition, the node 105 is connected via a capacitor Cfilter to ground. The combination of the resistor Rfilter and the capacitor Cfilter provide a low-pass RC filter. Such RC filter could also be provided by the integrated circuit, e.g., the FB control IC 101. It is also possible to provide different filters, e.g., a digital filter or a blanking time.

The secondary winding L1.3 of the transformer 103 is connected via a Diode D2 to a node 106 and with its other pin to ground. The node 106 is connected to ground via a capacitor C1. An output voltage $V_{out}$ and an output current $I_{out}$ are provided via outputs 107 and 108, wherein output 107 is connected to node 106 and output 108 is connected to ground.

Hence, the transformer 103 separates the primary side from the secondary side. In FIG. 1, the primary side is depicted on the left hand side of the transformer including the primary winding L1.1 and the secondary side is on the right hand side of the transformer including the secondary winding L1.3. The secondary side supplies the output ($V_{out}$, $I_{out}$) of the flyback converter.

The current flowing through the Mosfet 102 (on the primary side of the transformer) is advantageously monitored (merely) during the on-phase $t_{On}$ of the Mosfet 102. This can be achieved via the low-resistive resistor Rshunt. The voltage drop over the resistor Rshunt is measured via the pin FBSense (as the resistance values of Rshunt is known, the voltage determined at the pin FBSense corresponds to a current according to I=U/R). The resistance value of the resistor R1 may be substantially larger than the resistance value of Rshunt, thus the current flows via the resistor Rshunt to ground. The current through the resistor R1 is in such scenario negligible.

During the off-phase $t_{Off}$ of the Mosfet 102, no signal is supplied at the resistor Rshunt. During this off-phase $t_{Off}$, the pin FBSense can be utilized to determine (in particular measure) the output voltage $V_{out}$ of the flyback converter and the time $t_{ZCD}$, at which the current in the secondary winding of the transformer reaches zero. For this purpose, the additional winding L1.2 is used to supply a signal via the filter comprising Rfilter and Cfilter, the diode D1 and the resistors R2 and R1 to ground. The resistors R1 and R2 are used as voltage divider to ground. The low-impedance resistor Rshunt is in this case negligible, as the resistance of R1 is substantially higher than the resistance of Rshunt. For example, the low-impedance resistor Rshunt can be set to 1 ohm and the resistor R1 can be set to 1 kohm.

Hence, various signals that are beneficial for effectively operating a flyback converter are determined at different moments in time (during a duty cycle of the FB switching element comprising an on-phase and an off-phase). This allows measuring the current flowing through the FB switching element, during the on-phase of the FB switching element and measuring the output voltage $V_{out}$ of the flyback converter and the time $t_{ZCD}$ during the off-phase of the FB switching element via a single pin of the FB control IC 101.

Advantageously, the parameters (signals) determined at the primary side of the transformer can be used to control the output voltage $V_{out}$ and the output current $I_{out}$ of the flyback converter's secondary side.

Figure 2:
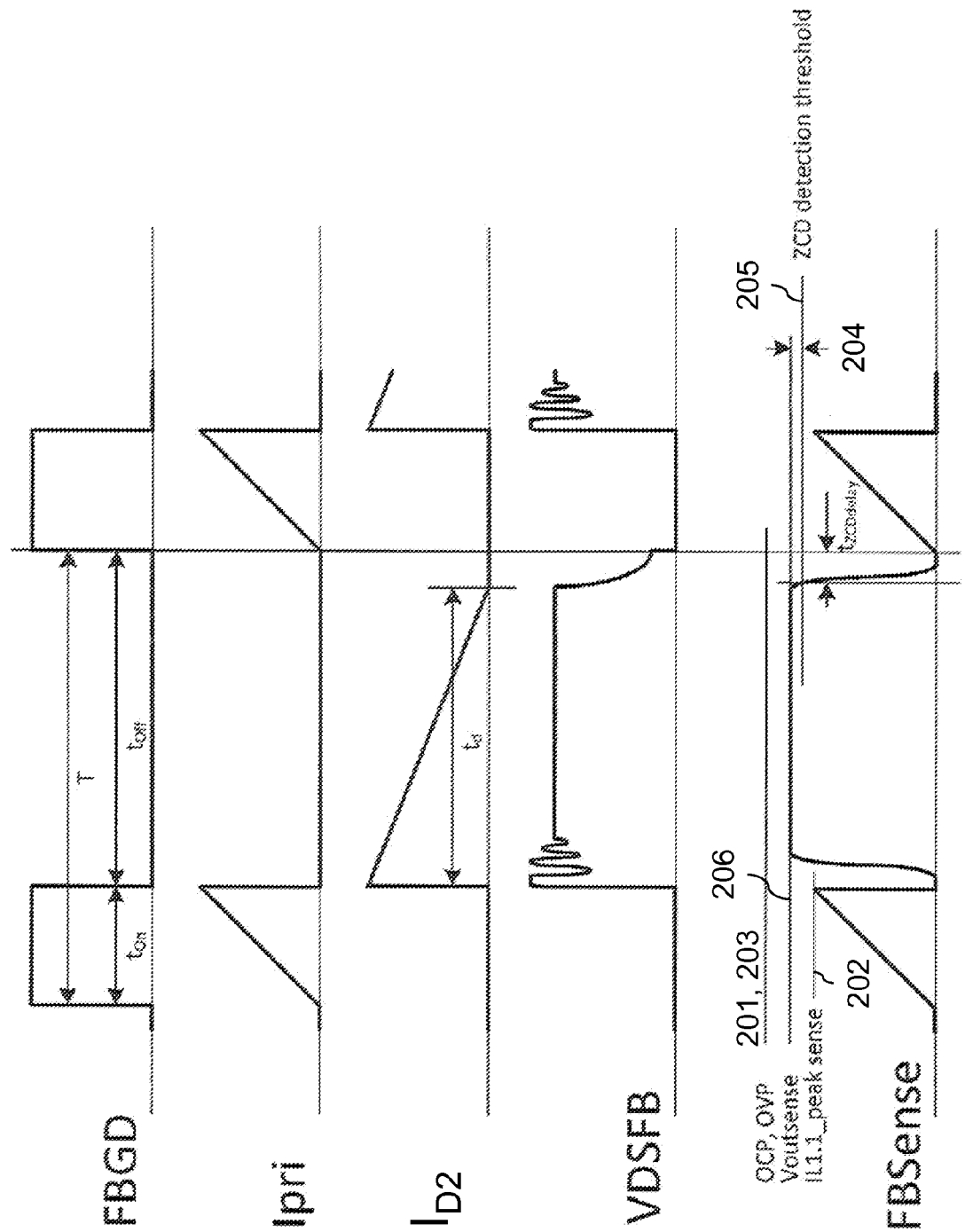
FIG. 2 shows in a schematic way various signal curves over time based on the circuit diagram of FIG. 1.

FIG. 2 shows in a schematic way various signal curves over time based on the circuit diagram of FIG. 1. The signal at the pin FBGD shows the flyback gate driving signal with a duty cycle T comprising an on-phase $t_{On}$ and an off-phase $t_{Off}$. The signal Ipri depicts the current on the primary side of the transformer 103 (i.e. the current flowing through the Mosfet 102), also referred to as "primary current", the signal $I_{D2}$ visualizes the current flowing through the diode D2 on the secondary side of the transformer 103 and the signal VDSFB shows the voltage at the drain of the Mosfet 102. In addition, the resulting signal at the pin FBSense of the FB control IC 101 is shown based on the above.

During the on-phase $t_{On}$ of the signal at the FBGD pin a voltage that is proportional to the primary current Ipri can be detected at the FBSense pin. Hence, a primary current exceeding a predetermined threshold can be detected. FIG. 2 exemplarily shows an OCP (over current protection) threshold 201.

A peak current IL1.1_peak can also be determined via other means, e.g., via the gradient of the current and/or the turn-on time. The value of the peak current 202 (also referred to as "IL1.1_peak sense") can be used to set and/or control the output current $I_{out}$ of the flyback converter to a predetermined value.

During the off-phase $t_{Off}$ of the signal at the FBGD pin, a voltage is supplied to the FBSense pin that corresponds to the output voltage $V_{out}$ or is proportional to the output voltage $V_{out}$ of the flyback converter. Depending on the particular use case scenario, the dimensioning and/or the accuracy required, the low-pass filter comprising the resistor Rfilter and the capacitor Cfilter can be provided, omitted or integrated in the converter control unit. Also, other types of filters can be utilized, e.g., digital filters. In addition or as an alternative, the signal at the FBSense pin can be utilized for control purposes at a particular moment or for a predetermined time during the off-phase $t_{Off}$, e.g., after some offset time that allows transient effects to fade. It is noted that the effects described for the signals determined at the FBSense pin apply to voltage or current signals.

The amplitude of the signal detected at the FBSense pin can be used for controlling the output voltage $V_{out}$ of the flyback converter. The amplitude can also be used for detecting an output voltage $V_{out}$ that is too high. This can be achieved via an OVP (over voltage protection) threshold 203.

It is noted that the OCP threshold 201 and the OVP threshold 203 could be different thresholds. Using identical thresholds 201 and 203 allows adjusting the threshold via the resistor R1 and/or the resistor R2. A second threshold different from the first threshold allows for an additional degree of freedom regarding the design of the circuit.

The output signal of the flyback converter is supplied to the FBSense pin as long as current is flowing on the secondary side of the transformer. This duration is indicated by $t_d$ in FIG. 2 showing the current flowing through the diode D2. Once the current $I_{D2}$ reaches zero, the voltage supplied to the FBSense pin decreases (i.e. starting at the end of the duration $t_d$).

The moment when the duration $t_d$ is over (ZCD: zero current detection, $t_{ZCD}$: time when $I_{D2}$ reaches zero) is detected in order to become aware of a suitable time to switch on the Mosfet 102 again, i.e. to provide another on-phase $t_{On}$ via the FBGD pin (valley switching).

As an option, a delay $t_{ZCDdelay}$ can be introduced after the current $I_{D2}$ has reached zero.

The time $t_{ZCD}$ can be determined via the FBSense pin by determining a decrease of the signal supplied to the FBSense pin, e.g., if such decrease is larger than a variation 204. As an alternative, the decrease of the signal supplied to the FBSense pin can be compared with a ZCD detection threshold 205 or the variation 204: If reached or falling short of such threshold 205 (or the variation 204), the moment $t_{ZCD}$ is assumed to be detected. The ZCD detection threshold 205 can be fix or variable. As an option, the output voltage $V_{out}$ 206 detected can be used to adaptively adjust the ZCD detection threshold 205, e.g., with regard to a predefined value or percentage of the output voltage $V_{out}$ 206. A falling signal can also be detected via other operations that could be implemented by the integrated circuit.

In a discontinuous conduction mode (DCM) of the flyback converter, a later minimum of the drain voltage of the Mosfet 102 can be detected via the ZCD detection threshold 205. Hence, a delay before re-entering the on-phase can be efficiently realized.

The solution presented herein has the advantage that the control of the output signal of the flyback converter can be realized independently from the voltage supply VCC fed to the FB control IC 101. This is in particular useful if several FB controllers are implemented in a single IC, which is supplied by a single voltage supply VCC. The solution suggested allows for each FB controller (even if there are additional FB controllers in an IC responsible for controlling different flyback converters) to independently act based on signals supplied to its FBSense pin.

The solution presented is applicable to various kinds of converters, in particular DC/DC converters.

It is noted that the switching element on the primary side of the converter can be a half bridge or a full bridge element. In addition, at least a part of the electronic switched (transistors, Mosfets) could be realized as diodes.

Figure 3:
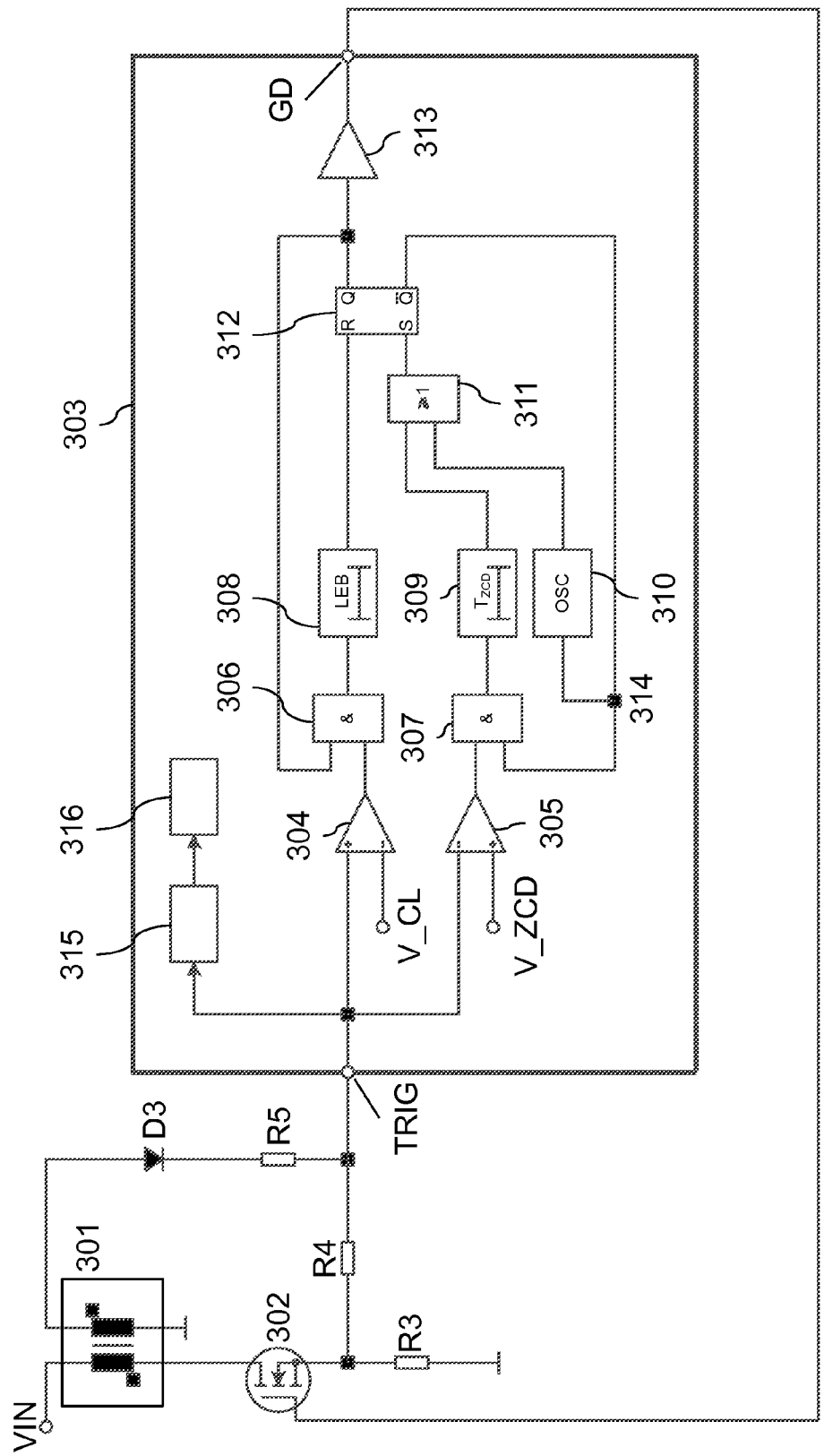
FIG. 3 shows an exemplary embodiment comprising two comparators.

FIG. 3 shows an exemplary embodiment comprising two comparators. A signal VIN is fed to the primary side of a transformer 301 which is further connected to the drain of a Mosfet 302. The source of the Mosfet 302 is connected via a resistor R3 to ground and via a resistor R4 to a trigger pin TRIG of a FB control IC 303. The secondary side of the transformer 301 is connected to ground and via a series connection comprising a diode D3 and a resistor R5 to the trigger pin TRIG. The cathode of the diode D3 points towards the trigger pin TRIG. The FB control IC 303 also has a gate driver pin GD that is connected to the gate of the Mosfet 302.

The FB control IC 303 comprises two comparators 304, 305, two AND gates 306, 307, an OR gate 311, an RS-Flip-Flop 312, an oscillator 310, a filter element 308, a filter element 309 and a gate driver 313.

The trigger pin TRIG is connected to the positive input of the comparator 304 and to the negative input of the comparator 305. A signal V_CL is fed to the negative input of the comparator 304 and a signal V_ZCD is fed to the positive input of the comparator 305.

The trigger pin TRIG is also connected to a voltage sensing unit 315 which provides an output signal to a control component 316. For example with reference to FIG. 2, the sensing unit 315 may determine the output voltage $V_{out}$ of the flyback converter and may—e.g., for control and monitoring purposes—convey such information to the control component 316. The control component can, e.g., influence the duration of the on-phase of the FB controller for adjusting the output voltage or in order to switch off the output voltage.

The output of the comparator 304 is connected to the first input of the AND gate 306, the output of the AND gate 306 is connected via the filter 308 to the R input of the Flip-Flop 312. The Q output of the Flip-Flop 312 is connected to the second input of the AND gate 306 and via the gate driver 313 to the pin GD.

The output of the comparator 305 is connected to the first input of the AND gate 307, the output of the AND gate 307 is connected via the filter 309 to the first input of the OR gate 311. The output of the OR gate 311 is connected to the S input of the Flip-Flop 312. The inverse Q output of the Flip-Flop 312 is connected to a node 314, which is connected to the second input of the AND gate 307 and via the oscillator 310 to the second input of the OR gate 311.

The oscillator 310 defines a trigger for switching on the gate driver (pin GD) by setting the Flip-Flop 312. During operation, the pin GD is repeatedly switched on by the zero crossing signal of the transformer 301 via the comparator 305. Then, the oscillator 310 is merely required for triggering the switching on of the gate driver in case no zero crossing signal is detected within a predetermined period of time. During operation, the oscillator 310 can be reset and restarted when the gate driver is switched off.

The signal V_CL in combination with the comparator 304 provide a cycle-by-cycle current limiting function, which leads to a switching off of the gate driver. The signal V_ZCD and the comparator 305 provide a zero crossing detection, which results in a switching on of the gate driver.

The filter element 308 (LEB: Leading Edge Blanking) filters a current peak which occurs at the beginning of the switching on phase. The filter element 309 filters out or reduces oscillations at high frequencies occurring at the beginning of the switching off phase; such oscillations might otherwise result in wrong trigger moments. In addition, the filter element 309 delays the switching on impulse thereby enabling valley switching, i.e. allowing for a switching moment after zero crossing detection when the voltage at the drain of the Mosfet 302 reaches a low point.

The gates 304 and 305 enable an alternating activation/deactivation of the switching on and off triggers, which ensures that during the ON phase of the gate driver only comparator 304 is active for switching on and during the OFF phase of the gate driver only comparator 305 is active for switching off.

Figure 4:
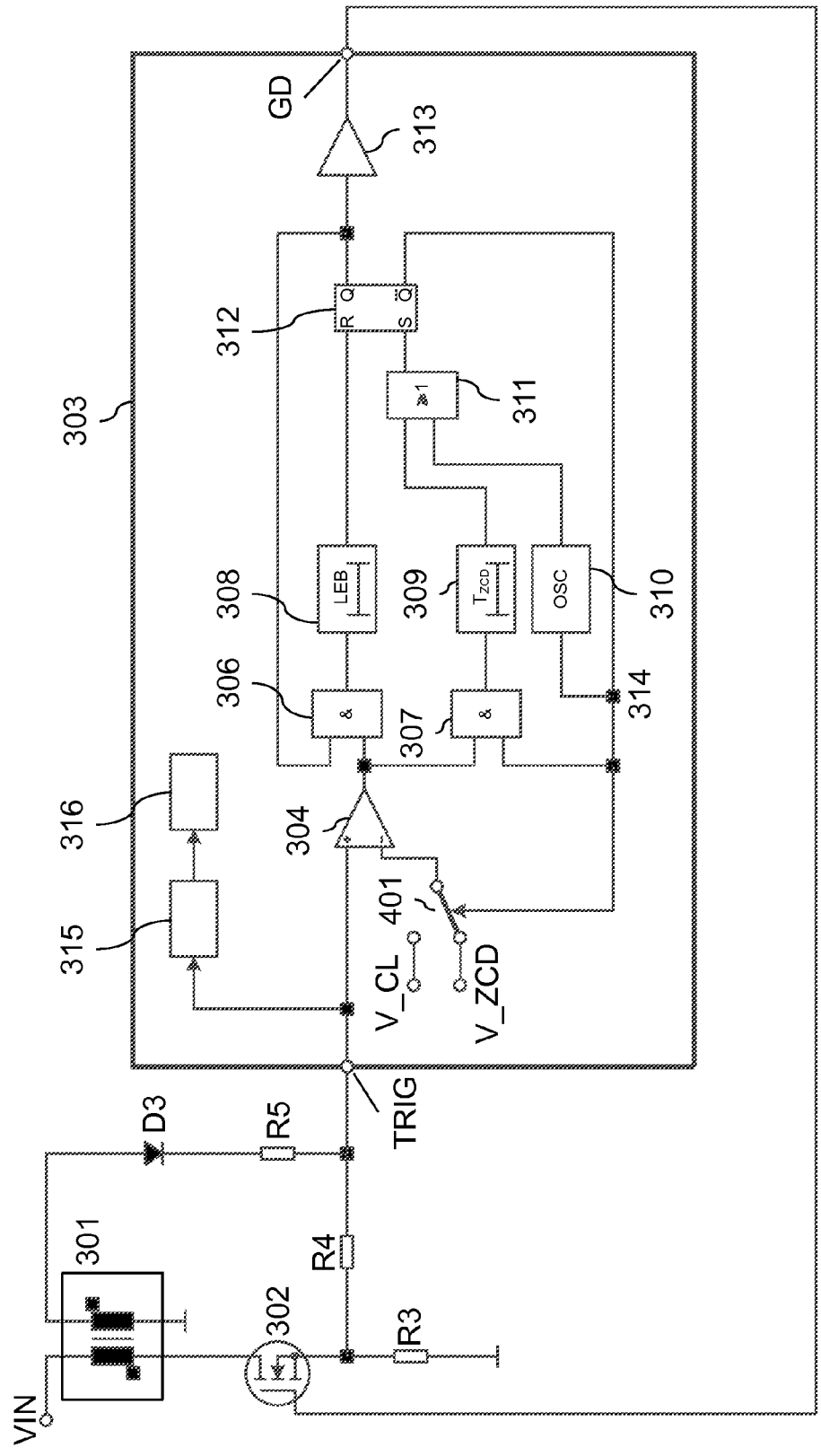
FIG. 4 shows an embodiment with a comparator and a switchable threshold.

FIG. 4 shows an embodiment with a comparator and a switchable threshold. The exemplary diagram of FIG. 4 is based on FIG. 3; however, the second comparator 305 is omitted, instead a switching element 401 is introduced that connects either signal V_CL or signal V_ZCD to the negative input of the comparator 304 in an alternating manner. The switching element 401 is also connected to the node 314. The output of the comparator 304 is further connected to the first input of the AND gate 307.

Figure 5:
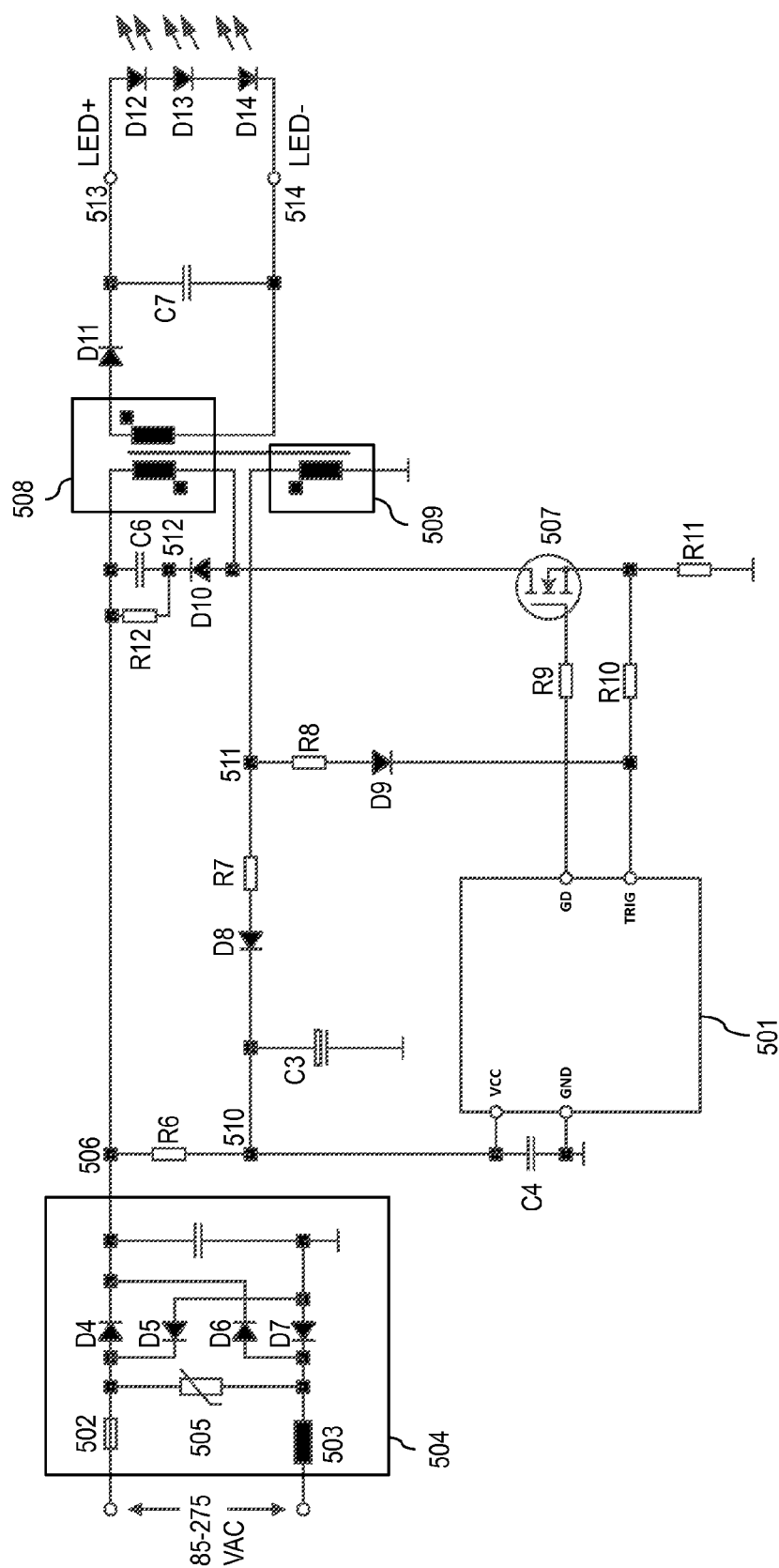
FIG. 5 shows an exemplary diagram of an embodiment comprising a single-stage LED bulb application.

FIG. 5 shows an exemplary diagram of an embodiment comprising a single-stage LED bulb application.

An input voltage in the range between 85 VAC and 275 VAC is fed to a rectifier unit 504 comprising a fuse 502, a temperature-sensitive resistor 505, an inductor 503, a capacitor C2 and several diodes D4 to D7. A rectified signal is thus supplied via a node 506 and ground.

The node 506 is connected via a resistor R6 to a node 510. The node 510 is connected to a supply voltage pin VCC of a FB controller 501. The node 510 and ground are also connected via a capacitor C4, wherein ground is also supplied to the FB controller 501 (via its GND pin).

The node 510 is connected via a capacitor C3 (e.g., an electrolytic capacitor) to ground. The node 510 is further connected via a series connection comprising a diode D8 and a resistor R7 to a node 511, wherein the cathode of the diode D8 points towards node 510. The node 511 is connected via a series connection comprising a resistor R8 and a diode D9 to a trigger pin TRIG of the FB controller 501, wherein the cathode of the diode D9 points towards the trigger pin TRIG. The trigger pin TRIG is connected via a resistor R10 to the source of a Mosfet 507, wherein this source is also connected via a resistor R11 to ground. A gate driver pin GD of the FB controller 501 is connected via a resistor R9 to the gate of the Mosfet 507. The drain of the Mosfet 507 is connected via a diode D10 to a node 512. The node 512 and the node 506 are connected via a resistor R12 and via a capacitor C6, respectively. Between the node 506 and the drain of the Mosfet 507 a primary winding of a transformer 508 is arranged.

One pin of the secondary winding of the transformer 508 is connected via a diode D11 to an output 513, wherein the cathode of the diode D11 points towards the output 513. The other pin of the secondary winding of the transformer 508 is connected to an output 514. Between the outputs 513 and 514 a capacitor C7 is provided. Via the outputs 513 and 514 a voltage for connecting several LEDs D12 to D14 in series is supplied.

An auxiliary winding 509 of the transformer 508 is connected between ground and the node 511 providing trigger information to the trigger pin TRIG of the FB controller 501.

Figure 7:
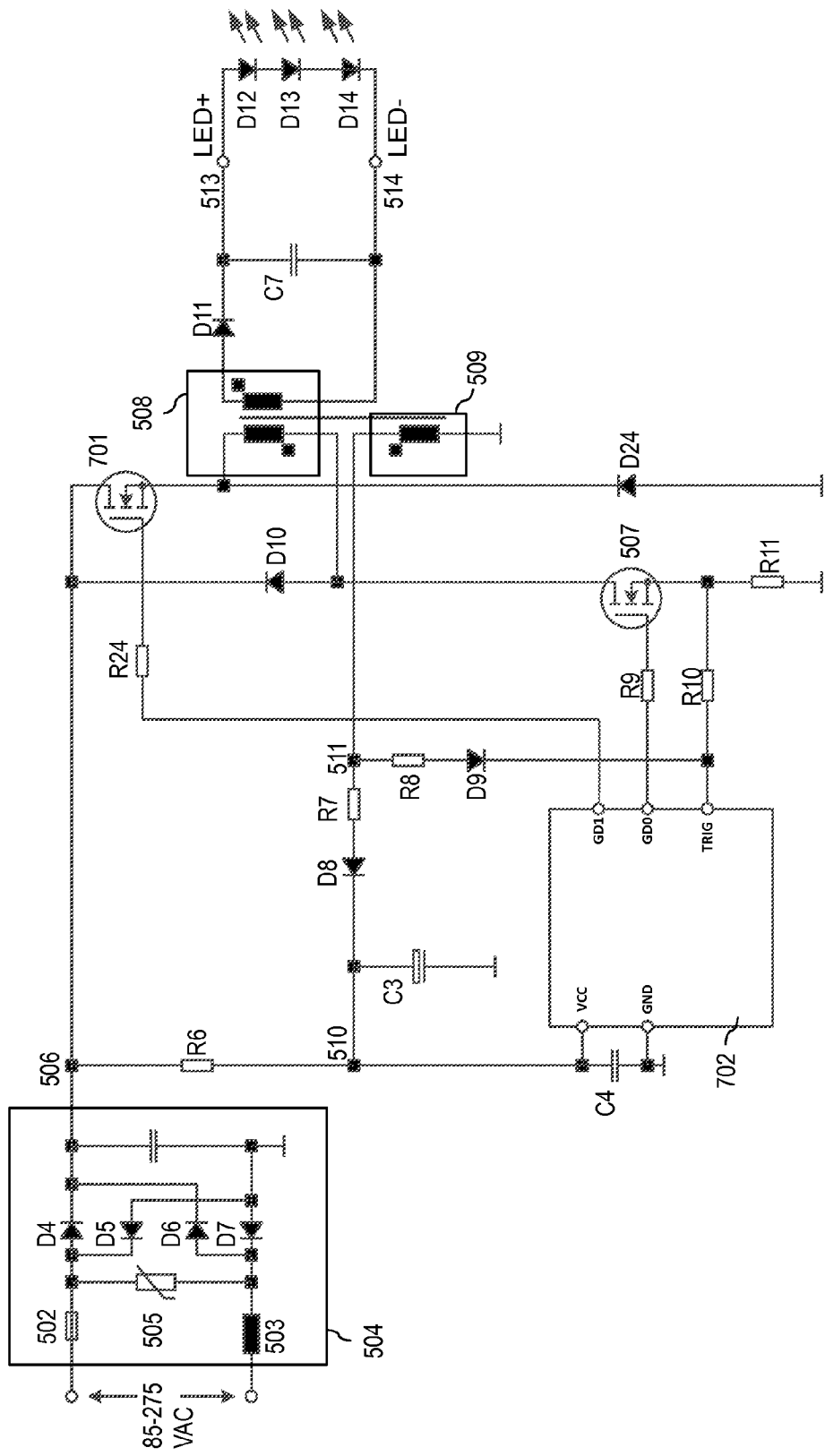
FIG. 7 shows a diagram of an alternative embodiment to FIG. 5 utilizing two Mosfets as electronic switching elements in a flyback converter.

FIG. 7 shows a diagram of an alternative embodiment. The circuit partially corresponds to the one shown in and explained with regard to FIG. 5. In contrast to the FB controller 501 of FIG. 5, a FB controller 702 comprises two gate driver pins GD0 and GD1, wherein the gate driver pin GD0 drives the Mosfet 507 and thus corresponds to the gate driver pin GD in FIG. 5.

Compared to FIG. 5, the resistor R12 and the capacitor C6 are omitted in FIG. 7; instead the cathode of the diode D10 is connected to the node 506. Further, FIG. 7 shows a Mosfet 701 with a gate that is connected via a resistor R24 to the gate driver pin GD1. The source of the Mosfet 701 is connected to the primary side of the transformer (instead of the node 506 according to FIG. 5). The drain of the Mosfet 701 is connected to the node 506. In addition, the source of the Mosfet 701 is connected via a diode D24 to ground, wherein the anode of the diode D24 points towards ground.

Preferably, the pulse-width-modulated signals at the pins GD0 and GD1 are in-phase and correspond to the output signal at the gate driver pin GD of the single-stage FB controller 501 according to FIG. 5.

Figure 6:
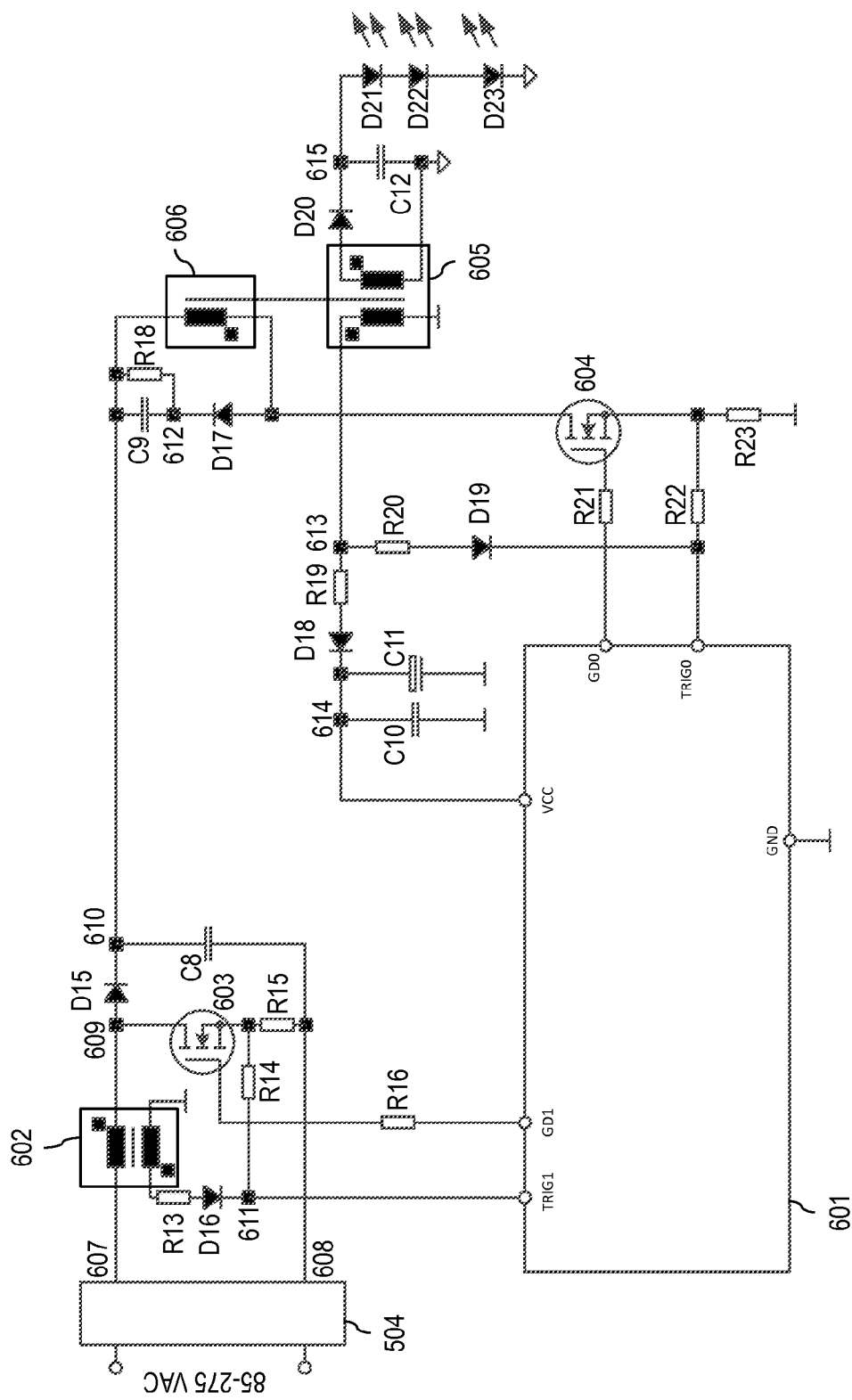
FIG. 6 shows an exemplary diagram of an alternative embodiment comprising a two-stage LED bulb application with a power-factor-correction (PFC) stage.

FIG. 6 shows an exemplary diagram of an alternative embodiment comprising a two-stage LED bulb application with a power-factor-correction (PFC) stage.

An input voltage in the range between 85 VAC and 275 VAC is fed to a rectifier unit 504 according to the one shown in FIG. 5; a rectified signal is thus provided between nodes 607 and 608. The node 607 is connected via a primary side of a transformer 602 to a node 609. The node 608 is connected via a capacitor C8 with a node 610. A diode D15 is connected between the nodes 609 and 610, wherein the cathode of the diode D15 points towards node 610. The node 608 is further connected via a resistor R15 to a source of a Mosfet 603. The source of the Mosfet 603 is also connected via a resistor R14 to a node 611. The node 611 is connected via a series connection comprising a diode D16, a resistor R13 and the secondary side of the transformer 602 to ground, wherein the diode cathode of the D16 points toward the node 611. The node 611 is also connected to a trigger pin TRIG1 of a controller 601, which provides for PFC and FB control. A gate driver pin GD1 of the controller 601 is connected via a resistor R16 to the gate of the Mosfet 603. The drain of the Mosfet 603 is connected to the node 609.

The node 610 is connected via a capacitor C9 to a node 612; the nodes 610 and 612 are also connected via a resistor R18. The node 612 is connected via a diode D17 to the drain of a Mosfet 604. The drain of the Mosfet 604 and the node 607 are also connected via an auxiliary winding 606 of a transformer 605. The source of the Mosfet 604 is connected via a resistor R23 to ground. Also, the source of the Mosfet 604 is connected via a resistor R22 with a trigger pin TRIG0 of the controller 601. A gate driver pin GD0 of the controller 601 is connected via a resistor R21 to the gate of the Mosfet 604. The trigger pin TRIG0 of the controller 601 is also connected via a series connection of a diode D19 and a resistor R20 to a node 613, wherein the cathode of the diode D19 points towards the trigger pin TRIG0. The node 613 is connected via a primary side of the transformer 605 to ground. The node 613 is further connected via series connection comprising a resistor R19 and a diode D18 to a node 614, wherein the cathode of the diode D18 points towards node 614. The node 614 is connected via a capacitor C10 and via a capacitor C11 to ground, respectively; the capacitor C11 may be an electrolytic capacitor. The node 614 is further connected to the supply power pin VCC of the controller 601. The controller 601 is also connected to ground via a pin GND.

One pin of the secondary winding of the transformer 605 is connected via a diode D20 to a node 615, wherein the cathode of the diode D20 points towards node 615 and the other pin of the secondary winding of the transformer 605 is connected to ground. Also, between the node 615 and ground a capacitor C12 is provided. The node 615 supplies a voltage for driving a series connection of several LEDs D21 to D23.

The first power stage that is shown in the embodiment of FIG. 6 comprises a power factor correction (PFC) unit. The PFC unit provides a sinusoidal input current shaping that is in-phase with a sinusoidal input voltage signal in order to achieve a high power factor. The shown embodiment comprises a boost converter that may work in a discontinuous current mode (DCM). Operating in DCM, the current through the Mosfet 603 starts from 0, when the Mosfet is switched on. This operation mode can be achieved when the next switch-on of the Mosfet 603 starts after the transformer 602 is demagnetized. Such end of demagnetization can be detected by means of a zero crossing detection via a sensing path built by the auxiliary winding of transformer 602, the resistor R13 and the diode D16. A peak current sensing at the resistor R15 can also be combined via the resistor R14 at node 611 with the zero crossing detection path as both signals a occurring in an alternating manner.

Combining the zero crossing and peak current detection of the PFC unit a pin TRIG1 supports the implementation of the dual stage approach in a very small package at a low pin count.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. It should be mentioned that features explained with reference to a specific figure may be combined with features of other figures, even in those cases in which this has not explicitly been mentioned. Further, the methods of the invention may be achieved in either all software implementations, using the appropriate processor instructions, or in hybrid implementations that utilize a combination of hardware logic and software logic to achieve the same results. Such modifications to the inventive concept are intended to be covered by the appended claims.

The invention claimed is:

1. A converter comprising
a transformer providing a galvanic isolation between a primary side and a secondary side of the converter;
at least one switching element;
a converter control unit comprising
a first pin for controlling the at least one switching element and
a second pin
for detecting a current signal in the at least one switching element during a first phase; and
for detecting an output voltage signal of the secondary side of the converter and an information regarding a current in a secondary winding of the transformer during a second phase;
wherein the output voltage signal of the secondary side of the converter and the information regarding the current in the secondary winding of the transformer during the second phase are detected by an additional winding of the transformer that is fed via a series connection of a diode and a resistor to the second pin.

2. The converter according to claim 1, wherein the at least one switching element comprises a transistor or a Mosfet.

3. The converter according to claim 1, wherein the converter is a flyback converter.

4. The converter according to claim 1, wherein the converter control unit is an integrated circuit.

5. The converter according to claim 1, wherein the first phase is an on-phase of the at least one switching element.

6. The converter according to claim 1, wherein the second phase is an off-phase of the at least one switching element.

7. The converter according to claim 1, wherein the current signal comprises a current or a part of a current flowing through the at least one switching element during an on-phase of the at least one switching element.

8. The converter according to claim 1, wherein the output voltage signal is a signal at the output of the converter or proportional to the signal at the output of the converter, in particular of a voltage supplied by the secondary winding of the transformer.

9. The converter according to claim 1, wherein the information regarding the current in the secondary winding of the transformer indicates that the current in the secondary winding of the transformer reaches or falls below a predefined threshold.

10. The converter according to claim 9, wherein the predefined threshold is fix or variable.

11. The converter according to claim 1, wherein the information regarding the current in the secondary winding of the transformer comprises a time at which the current in the secondary winding of the transformer reaches zero or reaches substantially zero.

12. The converter according to claim 1, wherein the current signal in the at least one switching element during the first phase is detected via a shunt resistor that is connected in series with the at least one switching element.

13. The converter according to claim 1, wherein the output voltage signal of the secondary side of the converter and the information regarding the current in the secondary winding of the transformer during the second phase are detected by an additional winding of the transformer that is fed via a series connection of a diode and a resistor to the second pin.

14. The converter according to claim 1, wherein the output voltage signal of the secondary side of the converter and the information regarding the current in the secondary winding of the transformer during the second phase are detected by an additional winding of the transformer that is fed via a low-pass filter and a series connection of a diode and a resistor to the second pin.

15. The converter according to claim 1,
wherein the current signal in the at least one switching element during the first phase is detected via a shunt resistor that is connected in series with the at least one switching element;
wherein the second pin is connected via a decoupling resistor to the shunt resistor.

16. The converter according to claim 1 comprising a comparing means that enables the second pin
  to detect the current signal in the at least one switching element during the first phase and
  to detect the output voltage signal of the secondary side of the converter and the information regarding the current in the secondary winding of the transformer during the second phase.

17. The converter according to claim 16, wherein the first phase is a charging phase of the converter and the second phase is a discharging phase of the converter.

18. The converter according to claim 1, wherein the at least one switching element is controlled via the first pin by the converter control unit based on the current signal detected during the first phase and the output voltage signal of the secondary side of the converter and the information regarding the current in the secondary winding of the transformer during the second phase.

19. The converter according to claim 1,
  wherein the information regarding the current in the secondary winding of the transformer comprises a time at which the current in the secondary winding of the transformer reaches zero or reaches substantially zero,
  wherein the at least one switching element is controlled via the first pin by the converter control unit based on
  the current signal detected during the first phase and the output voltage signal of the secondary side of the converter,
  the information regarding the current in the secondary winding of the transformer during the second phase and
  an additional delay added after the time at which the current in the secondary winding of the transformer reaches zero or reaches substantially zero.

20. The converter according to claim 1, wherein the at least one switching element comprises a half bridge with two electronic switches in series or a full bridge arrangement with two series connections of two electronic switches.

21. The converter according to claim 20, wherein at least one of the electronic switches is a diode.

22. The converter according to claim 1, wherein power for the converter control unit is supplied via the second pin.

23. A converter control unit for driving a converter comprising
  a first pin for controlling at least one switching element of the converter, wherein the converter comprises a transformer providing a galvanic isolation between a primary side and a secondary side of the converter,
  a second pin
  for detecting a current signal in the at least one switching element during a first phase; and
  for detecting an output voltage signal of the secondary side of the converter and an information regarding a current in a secondary winding of the transformer during a second phase;
  wherein the second pin is coupled between two series connected impedances.

24. A flyback converter that is controlled via the converter control unit according to claim 23.

25. The converter according to claim 23, wherein power is supplied to the converter control unit via the second pin.

26. The converter according to claim 23, wherein the first phase is an on-phase of the at least one switching element and the second phase is an off-phase of the at least one switching element.

27. The converter according to claim 23, wherein the output voltage signal is a signal at the output of the converter or proportional to the signal at the output of the converter, in particular of a voltage supplied by the secondary winding of the transformer.

28. A flyback converter system comprising
  a transformer providing a galvanic isolation between a primary side and a secondary side of the converter;
  at least one switching element; and
  a converter control unit comprising
  a first pin for controlling the at least one switching element; and
  a second pin
  for detecting a current signal in the at least one switching element during an on-phase of the at least one switching element; and
  for detecting via an additional winding of the transformer an output voltage signal of the secondary side of the converter and an information regarding a current in a secondary winding of the transformer during an off-phase of the at least one switching element, the additional winding connected via a series connection of a diode and a resistor to the second pin.

29. The flyback converter system according to claim 28, comprising
  a shunt resistor that is connected in series with the at least one switching element,
  a decoupling resistor that is connected between the second pin and the shunt resistor.

30. The flyback converter system according to claim 28, comprising
  the additional winding that is connected via a low-pass filter and a series connection of a diode and a resistor to the second pin,
  a shunt resistor that is connected in series with the at least one switching element,
  a decoupling resistor that is connected between the second pin and the shunt resistor.

31. A method for operating a converter,
  wherein the converter comprises a transformer providing a galvanic isolation between a primary side and a secondary side of the converter,
  comprising the following steps:
  detecting via a second pin of a converter control unit a current signal in at least one switching element during a first phase; and
  detecting via the second pin of the converter control unit an output voltage signal of the secondary side of the transformer and an information regarding a current in a secondary winding of the transformer during a second phase,
  controlling the at least one switching element via a first pin of the converter control unit,
  wherein the output voltage signal of the secondary side of the converter and the information regarding the current in the secondary winding of the transformer during the second phase are detected by an additional winding of the transformer that is fed via at least one diode to the second pin, wherein the cathode of the diode points towards the second pin.

32. The method according to claim 31, wherein the first phase is an on-phase of the at least one switching element and the second phase is an off-phase of the at least one switching element.

33. The method according to claim 31, wherein the output voltage signal is a signal at the output of the converter or proportional to the signal at the output of the converter, in particular of a voltage supplied by the secondary winding of the transformer.

34. The method according to claim 31, wherein the information regarding the current in the secondary winding of the transformer indicates that the current in the secondary winding of the transformer reaches or falls below a predefined threshold.

35. The method according to claim 31, wherein the information regarding the current in the secondary winding of the transformer comprises a time at which the current in the secondary winding of the transformer reaches zero or reaches substantially zero.

36. The method according to claim 31, wherein the output voltage signal of the secondary side of the converter and the information regarding the current in the secondary winding of the transformer during the second phase are detected by an additional winding of the transformer that is fed via a low-pass filter and the at least one diode to the second pin, wherein the cathode of the diode points towards the second pin.

37. The method according to claim 31,
wherein the information regarding the current in the secondary winding of the transformer comprises a time at which the current in the secondary winding of the transformer reaches zero or reaches substantially zero,
wherein the at least one switching element is controlled via the first pin by the converter control unit based on
the current signal detected during the first phase and the output voltage signal of the secondary side of the converter,
the information regarding the current in the secondary winding of the transformer during the second phase and
an additional delay added after the time at which the current in the secondary winding of the transformer reaches zero or reaches substantially zero.

38. A flyback converter comprising:
means for providing a galvanic isolation between a primary side and a secondary side of the converter;
switching means;
first detecting means for detecting a current signal in the switching means during an on-phase of the switching means;
second detecting means for detecting an output voltage signal of the secondary side of the converter and an information regarding a current in the secondary side of the converter during an off-phase of the switching means; and
control means comprising
a first pin for controlling the switching means; and
a second pin for detecting the signals and the information of the first detecting means and the second detecting means,
wherein the first detecting means comprises a shunt resistor that is connected in series with the switching means, and
a decoupling resistor is connected between the second pin and the shunt resistor.

39. The flyback converter according to claim 38, wherein the first detecting means comprises a shunt resistor that is connected in series with the switching means.

40. The flyback converter according to claim 38, wherein the means for providing the galvanic isolation comprises a transformer and the second detecting means comprises an additional winding of the transformer.

41. The flyback converter according to claim 40, wherein the additional winding is connected via a series connection of a diode and a resistor to the second pin.

42. The flyback converter according to claim 38, wherein the switching means comprises at least one flyback switching element, in particular at least one transistor, at least one diode or at least one Mosfet.

* * * * *